United States Patent [19]

Keller

[11] E Re. 30,298

[45] Reissued Jun. 3, 1980

[54] IMPACT SENSING DETECTOR

[76] Inventor: Michael I. Keller, 1935 Hawthorne Ave., Alexandria, Va. 22311

[21] Appl. No.: 863,856

[22] Filed: Dec. 23, 1977

Related U.S. Patent Documents

Reissue of:

[64] Patent No.: 3,930,248
Issued: Dec. 30, 1975
Appl. No.: 490,503
Filed: Jul. 22, 1974

[51] Int. Cl.[2] ..... G08B 23/00

[52] U.S. Cl. ..... 340/680; 100/99; 340/683; 364/475; 364/476; 364/551

[58] Field of Search ..... 340/501, 680, 683; 100/99; 364/475, 476

[56] References Cited

U.S. PATENT DOCUMENTS

| | | | |
|---|---|---|---|
| 2,991,531 | 7/1961 | Gates | 100/99 X |
| 3,161,044 | 12/1964 | Harrison et al. | 100/99 X |
| 3,257,652 | 6/1966 | Foster | 340/521 |
| 3,324,458 | 6/1967 | MacArthur | 364/200 |
| 3,406,387 | 10/1968 | Werme | 340/324 A |
| 3,474,438 | 10/1969 | Lauher | 340/324 A |
| 3,750,134 | 7/1973 | Weisend | 340/324 A |
| 3,839,628 | 10/1974 | Higgins et al. | 364/551 |
| 3,841,149 | 10/1974 | Edwin et al. | 364/551 X |
| 3,848,115 | 11/1974 | Sloane et al. | 340/683 X |

*Primary Examiner*—David L. Trafton
*Attorney, Agent, or Firm*—Leitner, Palan, Lyman, Martin & Bernstein

[57] ABSTRACT

An impact sensing detector for monitoring the operation of metal forming impact presses. The detector operates on an analog electric signal corresponding to the shock wave produced as the press ram impacts the fixed press platen and workpiece to produce a plurality of samples of the amplitude of said analog signal. These samples are digitized and compared against time corresponding standard samples previously derived from normal press operation. The detector may also be applied to other working areas of the press where waveform analysis can detect improper operation in order to avoid catastrophic failures. Predetermined differences between compared samples produce warning indicator signals which may be used to stop the press and also a fault analysis tool to help the press operator pinpoint the malfunction.

17 Claims, 7 Drawing Figures

FIG. 4
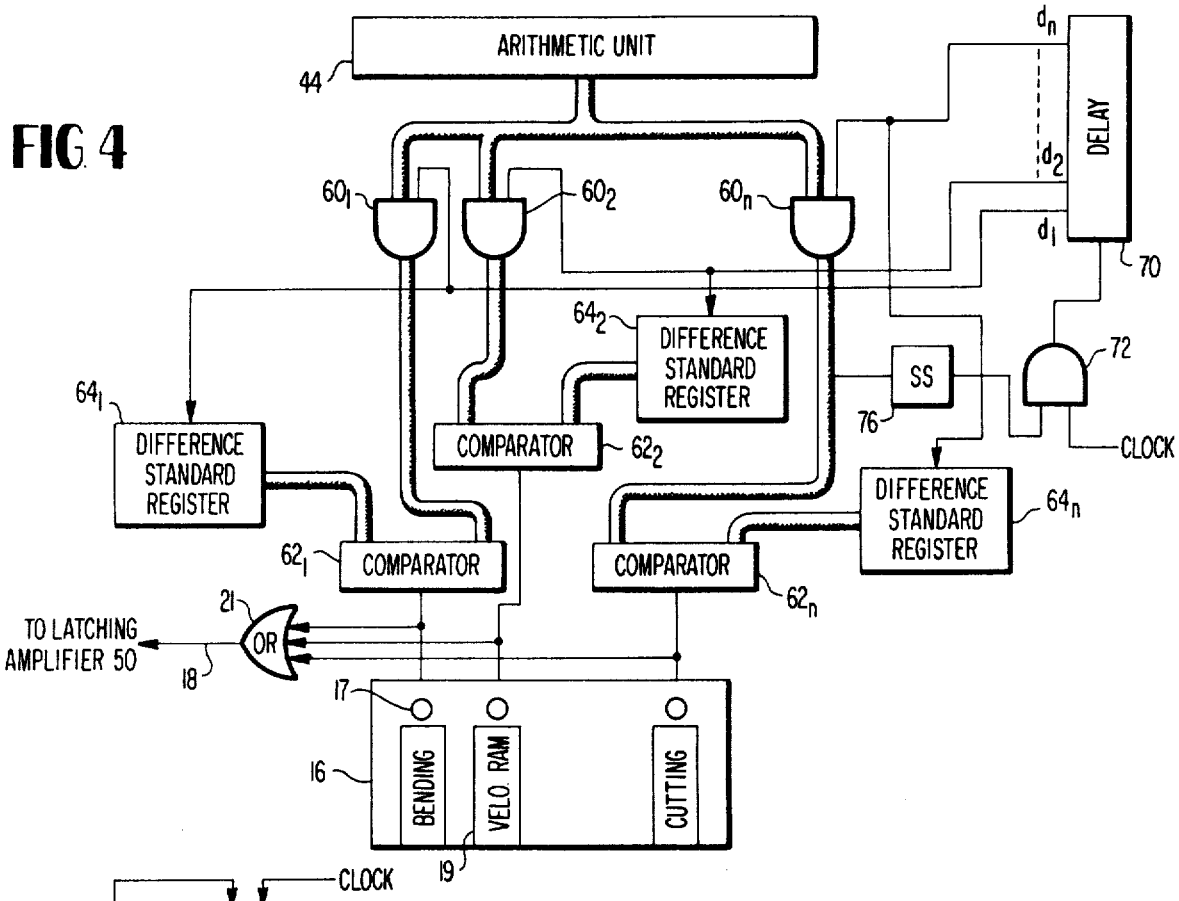
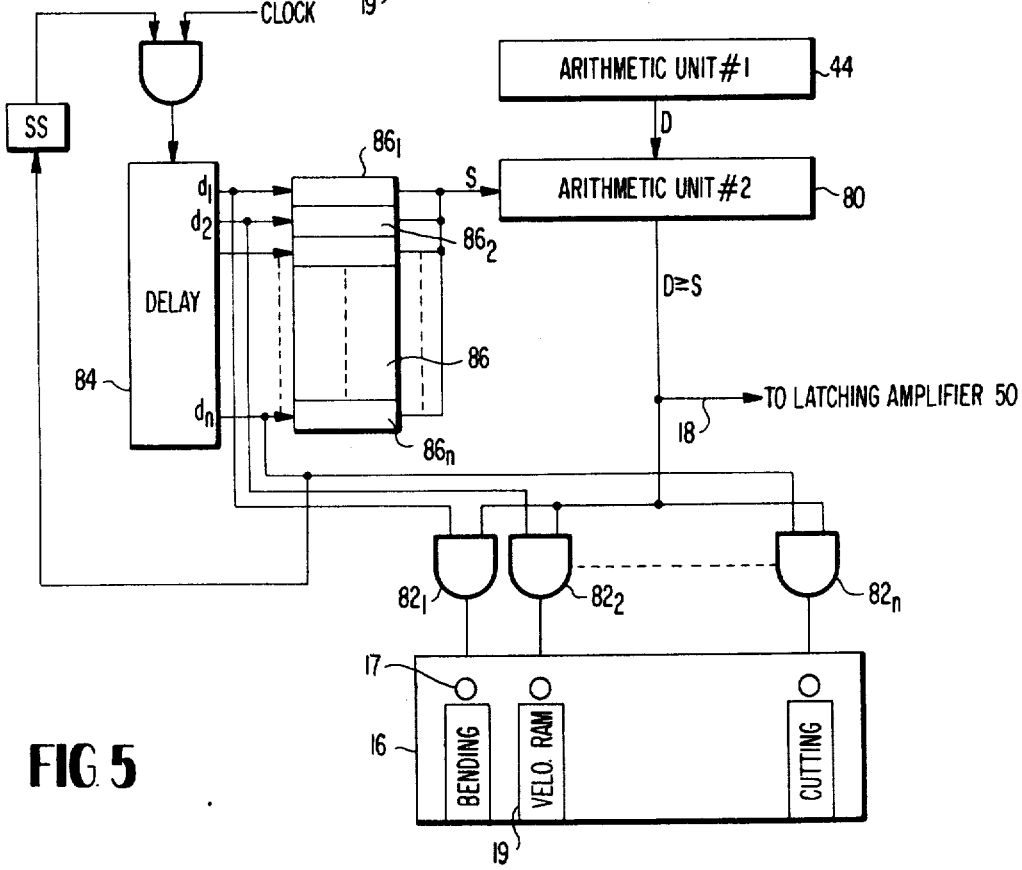
FIG. 5

IMPACT SENSING DETECTOR

Matter enclosed in heavy brackets [ ] appears in the original patent but forms no part of this reissue specification; matter printed in italics indicates the additions made by reissue.

BACKGROUND OF THE INVENTION

1. Field of Invention

The invention is in the field of impact sensing detectors for use in metal forming impact presses and more particularly detectors which detect irregular operation of the press tooling with respect to a workpiece.

2. Description of the Prior Art

Metal forming impact presses are used to operate on strips of metal, termed herein the workpiece, so as to form the workpiece into desired parts such as contacts for electrical connectors. The tooling with which these presses are equipped provide the means for cutting, bending, forming, etc. the basic workpiece into the desired part, be it a contact or any other of an almost infinite number of different parts.

Press operation is constantly, semi-automatically monitored to detect and react to sensed malfunctions. Presses must be observed to assure that the parts produced conform to standards and also to assure that minor malfunctions do not go undetected leading to catastrophic machine or tooling failure. Such catastrophic failures are extremely costly in that machine or tooling repair or replacement is expensive. Further, machine downtime reduces the manufacturer's output.

For these reasons, workers in the art have expended much time and effort in attempts to develop reliable automatic devices to detect machine malfunctions and particularly with respect to devices which will produce early indicators of improper operation leading to serious malfunctions. Such indicators permit the machine operator to take corrective action before the severe malfunction actually occurs, thus preventing expensive repairs and long machine downtime.

An example of an impact press malfunction detector is described in U.S. Pat. No. 3,444,390 to Breidenbach et al. issued May 13, 1969. Breidenback et al. teach the basic concept that irregular operation of the tooling on a workpiece in a press can be detected by detecting the peak amplitude of the shock developed as the press dies contact the workpiece. The detecting mechanism comprises a suitable transducer such as a piezoelectric transducer which converts shock induced vibrations, that is the shock wave, into an electrical output correlatable to the shock.

Breidenback et al. recognized that, in the prior art, the shock analysis technique is limited to comparatively simple shock waves due to the confusion of signals which results when the nature of the shock forces become complex. They indicate that signal confusion is a particular problem in presses in which press tooling is caused to perform multiple functions, such as cutting and drawing all in one stroke. The solution set forth therein is to threshold compare a peak shock amplitude as represented by the peak voltage amplitude produced by the piezoelectric transducer to an adjustable sensitivity level of a latching amplifier after the piezoelectric resonant frequency has been filtered out.

While such an approach may work well to detect catastrophic press failures, it fails to give indications of minor malfunctions which may lead to more severe trouble. The present invention is an improvement over the Breidenbach et al. press impact sensor and operates to develop several warning indicator signals unrelated to peak voltages which may be used to automatically stop the press and give the press operator an analysis tool whereby he may pinpoint the malfunction.

SUMMARY OF THE INVENTION

The invention provides an improved impact sensing detector for use with metal forming impact presses. The impact sensing detector of the present invention receives the transducer produced analog electric signal which correlates to the press produced complex shock wave and converts it into a time based series of digitized amplitude samples. Each sample is then compared to a time corresponding standard amplitude sample previously developed by monitoring a shock wave produced during normal manufacturing press operation. It has been determined that different press malfunctions cause different waveform variations detectable by comparing a multiplicity of amplitude samples of each shock wave with its time corresponding standard samples. The difference between compared samples are indicators of malfunction and when at least one of said indicators exceeds a predetermined programmed difference it becomes a warning indicator signal which may be used to stop the press. The warning indicator signal may also be applied to an operator monitored control panel which includes indicators to inform the operator of the probable location of the malfunction. Through experimentation with a press performing specific tooling operations, predetermined differences between corresponding samples of the amplitude of the shock wave and the standard will signify the probable location of malfunctioning portions of the press being studied or its tooling.

BRIEF DESCRIPTION OF THE DRAWINGS

FIG. 4 is a block diagram of one embodiment of the difference program circuitry of the impact sensing detector; and FIG. 5 is a block diagram of a second embodiment of the difference program circuitry of the impact sensing detector.

DETAILED DESCRIPTION OF THE PREFERRED EMBODIMENT

Figure 1:
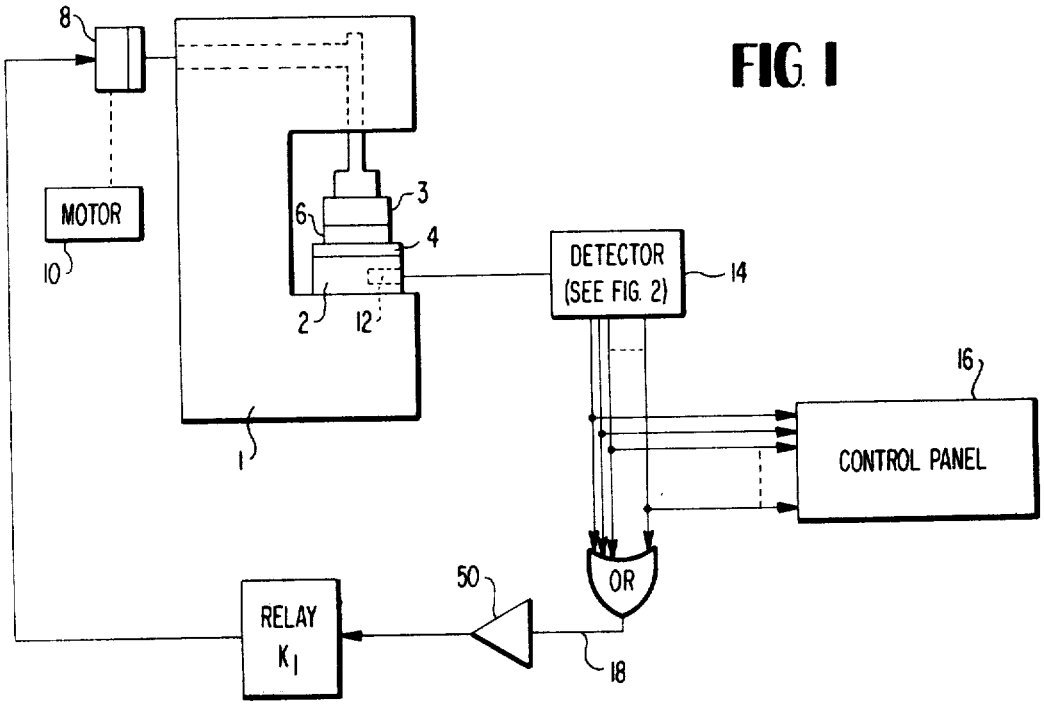
FIG. 1 represents a conventional press in combination with the impact sensing detector with this invention.

Referring now to the drawings, FIG. 1 depicts a conventional press assembly 1 having a fixed platen 2 fitted with a die 4 and a ram assembly 3 fitted with die 6. The ram assembly 3 is connected to an electrically controlled clutch/brake assembly 8 driven by motor 10.

In operation, a workpiece (not shown) to be formed into parts, is fed between the dies 4, 6 with ram 3 in its raised position. The ram is then caused to move downwards at high velocity impacting the workpiece resting on die 4 to complete the desired operation. Dies 4, 6 may take any of very many different shapes. In multiple function tooling, dies 4, 6 have several different cooperating areas to accomplish several operations. For example, the dies may include cooperating areas which independently perform a cutting operation, a bending operation and a crimping operation during each press cycle. In such a press, a portion of a continuous workpiece would initially be placed under the cutting area of dies 4, 6 with the first press stroke cutting this portion into an outline of the desired part. Thereafter, as the workpiece is fed further through the press 1, a second portion of the workpiece is positioned in the cutting area of the dies while retaining the previously, partially cut portion in the bending area. Thus, upon a second press stroke, as the die 6 on ram 3 strikes the workpiece resting over die 4, the previously cut portion of the workpiece is bent to shape, while the second portion is cut into the outline of a desired part. The process is continuous, with each press stroke operating to cause several different operations, although during each stroke a particular portion of the workpiece is experiencing only one operation. To those working in the art this is known as progressive die stamping.

It should thus become apparent to those skilled in the art that each time the die 6 on ram 3 impacts the workpiece, a shock wave is produced and that the nature of the shock is complex. The shock may be detected and converted into an electric analog signal by means of a transducer 12, such as a piezoelectric transducer, suitably mounted on press 1. An example of a suitable transducer mounting arrangement is described in the aforementioned Breidenbach et al. patent. This does not preclude the application of a multiplicity of transducers in a single press.

This electric analog signal is applied to the impact sensing detector 14 of the present invention. As will be more fully explained with reference to FIG. 2, when a malfunction occurs, a warning indicator signal is generated on an output line 18 to stop the press and provide a signal to control panel 16. When a multiplicity of transducers are used, an equal number of detectors would be employed, one being associated with each transducer.

Figure 2:
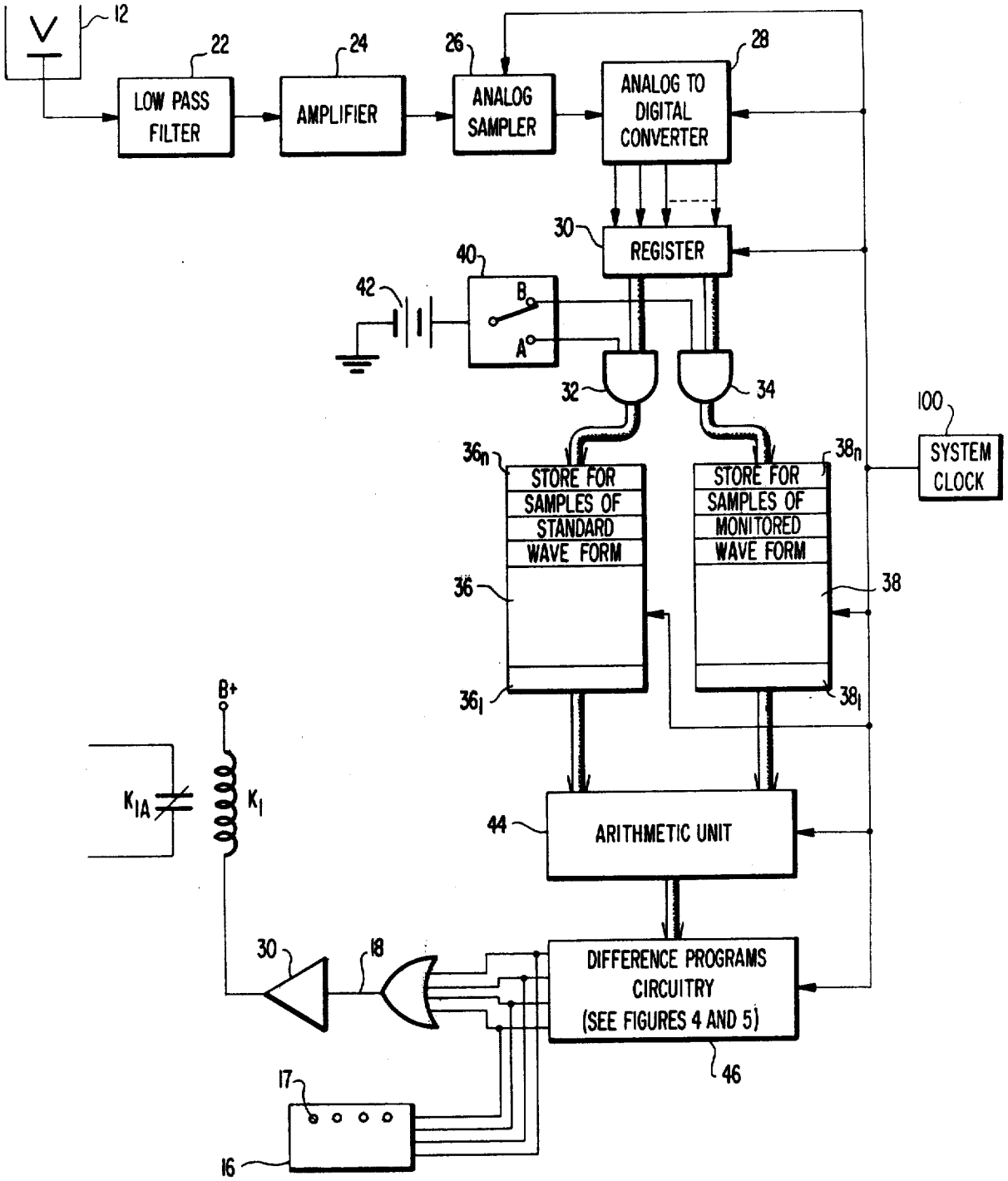
FIG. 2 is a block diagram of one embodiment of the impact sensing detector of the invention.

FIG. 2 illustrates the details of one embodiment of the detector 14 of the present invention. The output of transducer 12 is applied to low pass filter circuitry 22 which functions to substantially eliminate the high frequency portion of the signal generated by transducer 12, this high frequency component being attributable to the resonant frequency characteristic of the transducer element itself. Thus, the output of circuitry 22 represents the complex low frequency amplitude variation produced by the operation of the press, tooling, and workpiece.

The filtered analog signal is amplified in amplifier 24 and thereafter applied to a time gated analog sampler 26 wherein the shock induced electric analog signal is converted into periodic, very narrow amplitude samples which are applied to the analog-digital converter 28. Converter 28 operates to convert each amplitude sample into a digital word. Each word is applied to register 30 and from there it is transferred to either memory 36 or 38 depending upon whether AND gate 32 or 34 enabled through the operation of switch 40 connected to source 42. The aforementioned sequence is initiated by triggering a system clock 100 on the basis of an exceeded threshold (leading edge of the waveform).

Memories 36 and 38 may be identical. Memory 36, termed herein the store for samples of the standard waveform, stores the digital samples derived from the shock wave developed during a single impact of a normal press operation. Memory 38, which is termed the store for samples of the monitored shock wave, stores the digital samples derived from the monitored shock wave which occurs while the press is being monitored for warning indicators of press and/or tooling malfunction. At any one time, memory 38 stores samples derived from a single shock wave. After these samples are compared with time corresponding standard samples, they are dumped to make room for samples derived from the next shock wave produced upon the next ram stroke.

The comparisons of corresponding samples is carried out in arithmetic unit 44, which in the preferred embodiment is selected to produce a digital word representing the absolute value of the arithmetic difference between the amplitude of the sample stored in memory 38 and the amplitude of its corresponding sample in memory 36. Of course, arithmetic unit 44 may be selected to develop the actual arithmetic difference between corresponding samples.

Through experimentation with the monitored press, one learns that predetermined differences between certain samples provide indications of different malfunctions. These predetermined differences are used to cause the generation of warning indicator signals on line 18 through the operation of the difference programs circuitry 46, explained in detail with reference to FIG. 4. The warning indicator signals on line 18 trigger latching amplifier 50 to energize relay coil $K_1$ with cooperating normally closed switch $K_{1A}$. When coil $K_1$ is energized, switch $K_{1A}$ opens to de-energize the press via the electrically controlled clutch/brake assembly 8.

The operation of the impact sensing detector 14 will now be explained in greater detail. It should be noted at this point that the detector can be applied in multiplicity on a given press to function in a similar manner on band liited portions of a shock waveform. It should be further noted at this point that each element of the detector 14 is conventional and does not, by itself, form a portion of this invention.

Figure 3A:
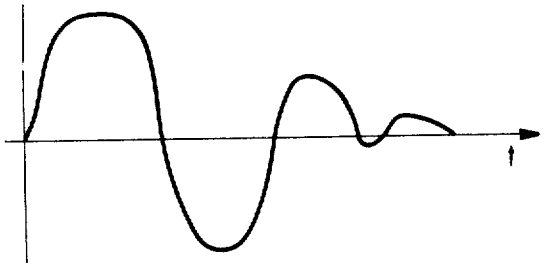
FIGS. 3a through 3c represent hypothetical waveforms useful in explaining the operating of the impact sensing detector.
Figure 3B:
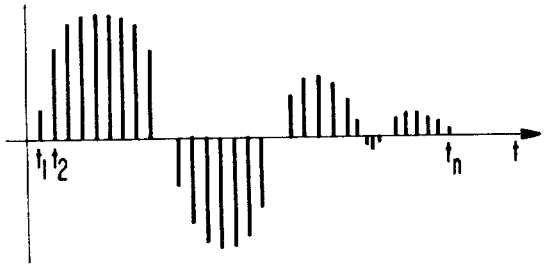

With the press operating normally, switch 40 is placed in position A to enable AND gate 32. The press produced shock wave is detected by transducer 12 to develop on electric analog signal representative of the normal manufacturing operation shock wave. FIG. 3a is a hypothetical representation of the waveform which would appear at the input of sampler 26 when the press is operating normally. The output of the sampler 26, a series of short duration pulses of individually varying amplitude corresponding to the analog input, as illustrated in FIG. 3b, is applied to the analog-digital converter 28 wherein each sample is converted into a digital word and successively applied to word locations $36_1$ through $36_1$ of memory 36 through gate 32. It should be understood by those skilled in the art that gate 32 represents several gates, one associated with each stage of register 30.

The first digitized sample $t_1$ is initially stored in word location $36_n$. As the second digitized sample $t_2$ is entered into memory 36, the sample $t_1$ stored in location $36_n$ is shifted into word location $36_{n-1}$ to make room for the second digitized sample $t_2$ which is now stored in location $36_n$. This process continues until all digitized samples of the standard waveform are stored in memory 36 with the first sample $t_1$ so stored being located in word location $36_1$.

With samples of the standard wave form digitized and stored in memory 36, the detector 14 is now ready to monitor the shock waves produced by the press 1 during its manufacturing operation. To accomplish this, the operator causes switch 40 to assume position B thereby disabling gate 32 while enabling gate 34. As with gate 32, gate 34 represents a plurality of gates, one associated with each stage of register 30.

Figure 3C:
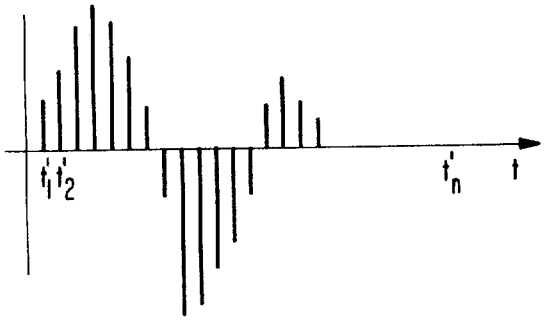

The manufacturing operation shock wave sensed by transducer 12 are converted into digitized samples in the manner previously described with respect to the formation of the digitized samples of standard waveform. However, during the manufacturing operation monitoring phase, the digitized samples of the shock wave are stored in memory 38. The operation of memory 38 corresponds to the operation of memory 36. With reference to FIG. 3c, which illustrates the samples of the transducer produced signal during press or tooling malfunction, the first sample, $t_1'$ of the monitored shock wave is stored in word location $\mathbf{38_1}$ while the last sample $t_n'$ is stored in word location $\mathbf{38_n}$. It should thus become apparent to those skilled in the art that corresponding word location in memories 36 and 38 store time corresponding samples of the standard and the electric analog signal representing the monitored shock wave. Thus, time corresponding samples $t_1$ and $t_1'$ are stored in corresponding word locations $\mathbf{36_1}$ and $\mathbf{38_1}$.

Time corresponding samples are now successively gated into the arithmetic unit 44 which generates, in this preferred embodiment, a digital word corresponding to the absolute value of the arithmetic difference between the standard sample and the sample of the monitored shock wave as represented by the electric analog signal. Each difference output is applied to the difference program circuitry 46 where it is compared with a programmed difference standard. As previously noted, these difference standards are determined by experimentation and electronically retained.

An example of the difference standards program circuitry 46 is illustrated in FIG. 4. The circuitry includes AND gates $\mathbf{60_1}$ through $\mathbf{60_n}$, each of which receives the digitized difference output from arithmetic unit 44. Each of these gates represents a plurality of gates, each receiving one bit of the digitized difference output. The outputs from gates $\mathbf{60_1}$ through $\mathbf{60_n}$ are applied as one input to respective comparators $\mathbf{62_1}$ through $\mathbf{62_n}$. A second input to each of these comparators is a digital word corresponding to a difference standard stored in respective registers $\mathbf{64_1}$ through $\mathbf{64_n}$. The outputs from the comparators are applied, via the OR gate 21, to line 18 to trigger latching amplifier 50 when a warning indicator signal is detected by any one or more of the comparators.

In operation, the samples stored in word locations $\mathbf{36_1}$ and $\mathbf{38_1}$ are compared in arithmetic unit 44 and the difference between these samples applied to comparator $\mathbf{62_1}$ through gate $\mathbf{60_1}$. At this point in time, gates $\mathbf{60_2}$ through $\mathbf{60_n}$ are disabled by the operation of delay unit 70. The delay unit 70 operates to successively enable gates $\mathbf{60_1}$ through $\mathbf{60_n}$ so that comparators $\mathbf{62_1}$ through $\mathbf{62_n}$ receive only the difference output corresponding to the difference between the signals stored in word locations $\mathbf{36_1}$, $\mathbf{38_1}$ through $\mathbf{36_n}$, $\mathbf{38_n}$ respectively.

The delay 70 operates in the following manner. After a transducer produced electric analog signal has been sampled, digitized, stored in memory 38 and compared with the standard stored in memory 36, a clock pulse is applied to AND gate 72 which has been enabled by the output of the single shot 76. The single shot 76 is triggered by the signals on line 63, said signals corresponding to the difference outputs produced upon a comparison of the samples stored in word location $\mathbf{36_n}$ with the sample stored in word location $\mathbf{38_n}$. Thus, the clock pulse enters delay unit 70 and appears on line $d_1$ in time coincidence with the difference output from arithmetic unit 44 produced by comparing the sample $t_1$ of the standard with the sample $t_1'$ of the monitored shock wave. As sample $t_2'$ of the standard is compared with sample $t_2'$ of the monitored shock, the clock pulse appears on line $d_2$ to enable gate $\mathbf{60_2}$, thereby permitting the difference output to enter comparator $\mathbf{62_2}$. Any additional clock pulses appearing at the input of gate 72 are prevented from entering delay unit 70 since when these clock pulses are generated, the single shot pulse has decayed and gate 72 is disabled. Thus, comparator $\mathbf{62_1}$ receives only the difference signal corresponding to the difference between sample $t_1$ and sample $t_1'$, while comparator $\mathbf{62_2}'$ receives only the difference signal corresponding to the difference between sample $t_2$ and sample $t_2'$ and so on.

As previously explained, the second input to each comparator is a difference standard stored in a corresponding register $\mathbf{64_1}$ through $\mathbf{64_n}$. Whenever the arithmetic difference from the arithmetic unit is equal to or greater than the difference standard, a warning indicator signal is generated at the comparator output. The result of each comparison may also be coupled to a respective warning lamp 17, or other suitable indicator such as a buzzer, on control panel 16. Each lamp 17 may be labeled with a description 19 of the probable location of the malfunction which caused the lamp to be energized. The warning indicator signal is applied to the latching amplifier 50 via the OR gate 21 and line 18 and simultaneously to one of the lamps 17 of the control panel 16 as described.

For purposes of illustration, it will be assumed that an investigation of the operation of a particular tooling, workpiece, and press using the detector system of the present invention has led to an independent determination that when sample $t_2$ is greater than sample $t_2'$ by at least voltage $V_1$, the velocity of the ram on contact with the workpiece was below that required to make an acceptable part. Thus, register $\mathbf{64_2}$ would be programmed to store the value $V_1$ and when a warning indicator signal is generated by comparator $\mathbf{62_2}$, a lamp 17 labeled "ram velocity" would light, informing the operator that there was a probable malfunction relating to the ram velocity. This would be particularly useful in blanking and cupping presses in which the two operations take place in rapid succession on a single stroke.

The above described detector system has many advantages over prior art impact sensing detectors. The detector of the present invention has the ability to detect and analyze an entire shock wave, rather than only its peak, and permits monitoring of a sequence of operations that can be taking place in the press. The apparatus of this invention which monitors the difference between time corresponding samples of a standard and a monitored shock wave permits programming to detect any level of difference that is a meaningful factor in a successful operation for longevity of the tooling and press. Costly repairs and downtime may be averted by proper operation of the difference program to thereby detect deviations that are symptomatic of an ultimate catastrophic machine or tooling failure.

A second embodiment of the difference program circuitry 46 is illustrated in FIG. 5. As compared to the FIG. 4 embodiment, the difference program circuitry of FIG. 5 uses fewer elements. More specifically, the several AND circuits $60_1$ through $60_n$, the several comparators $62_1$ through $62_n$ and OR gate 21 are replaced by a single arithmetic unit 80 and AND gates $82_1$ through $82_n$. Since each of the circuits $60_1$ through $60_n$ represents several AND circuits, the embodiment of FIG. 5 not only eliminates the several comparators but also reduces the number of AND circuits required.

The circuitry of FIG. 5 operates in the following manner. The output from the arithmetic unit 44 represents the absolute value of the difference between a monitored sample and its time corresponding standard sample. In the FIG. 5 embodiment, this output is denoted as D. The D output is applied to one input of a second arithmetic unit 80. A second input to the arithmetic unit 80 is the difference standard, denoted in FIG. 5 as S and stored in the memory 86. Memory 86 replaces the several difference standard registers $64_1$ through $64_n$ used in the FIG. 4 embodiment. Each of the word locations $86_1$ through $86_n$ of the memory 86 stores a different difference standard S.

As arithmetic unit 44 sequentially compares the samples stored in memories 36 and 38, delay 84 clocks out corresponding difference standards. This delay may be identical to delay 70. Thus, as the samples stored in word locations $36_1$ and $38_1$ are compared in the arithmetic unit 44, and the results D applied to arithmetic unit 80, line $d_1$ of the delay 84 generates a clocking signal causing the difference standard stored in word location $86_1$ to enter the arithmetic unit 80. Arithmetic unit 80 operates to provide an output in the form of a logic high whenever the difference signal D from arithmetic unit 44 is equal to greater than the difference standard S with which it has been compared. A logic high at the output of the arithmetic unit 80 causes latching amplifier 50 to activate relay coil $K_1$ whereby the press is stopped.

The AND gates $82_1$ through $82_n$ are provided to key the lamps 17 on the control panel 16 to specific comparisons. That is, when line $d_1$ is at a logic high, only gate $82_1$ is enabled and thus if a warning indicator signal is realized as a result of the comparison of the monitored sample stored in word location $38_1$ with the standard sample in word location $36_1$, only the lamp associated with the label "bending" lights. As the monitored samples in word locations $38_2$ etc., are sequentially compared with their corresponding standard samples stores in word locations $36_2$ etc., gates $82_2$ through $82_n$ are sequentially enabled while the difference standards stored in locations $86_2$ through $86_n$ are sequentially applied to the arithmetic unit 80.

The above described detector system as relates to tooling and workpiece can be applied as a fault detector in other workpiece working areas of a press. For example, the workpiece is generally mechanically advanced by cooperating, powder driven, geared pinch rollers which must reliably advance the workpiece prior to the impact of the ram. Failure to properly advance the workpiece can result in catastrophic failure of tooling and/or machine. Various techniques have been attempted to monitor the completion of the feeding portion of the machine cycle, but it has not been possible to detect slippage of the pinch rollers during any portion of the feed cycle. Such detection can be performed by the detector disclosed herein by detecting and processing the waveform generated by the power driven feed mechanism and workpiece being transferred, thereby sensing a misfeed before the tooling and workpiece are impacted.

What is claimed:

1. An apparatus for monitoring the operation of a mechanical press having relatively movable members including tooling, said members operating to close upon each other to thereby form a workpiece into a desired part comprising:

a. means for detecting the shock wave produced as the said members close upon each other, b. means for sampling the detected shock wave to produce a plurality of amplitude samples of said shock wave over time, c. means for storing each of said samples of the detected shock wave, d. means for producing standard samples representing samples of a shock wave produced when the press is operating normally, e. means for storing said standard samples, f. a first arithmetic means for electrically and successively comparing time-corresponding samples of the detected shock wave and standard samples to produce signals representing the difference in amplitude between each set of compared samples, g. means for storing a plurality of electrical representations of standard difference signals representing the permissible difference between each set of compared samples, h. means for electrically and successively comparing each difference signal with its corresponding standard difference signal, and i. means for producing a warning indicator signal when the value of at least one of said difference signals is greater than or less than its corresponding standard difference signal by a predetermined amount.

2. The apparatus of claim 1 wherein said means for detecting comprises transducer means for converting said shock wave into a electric analog, said means for sampling the detected shock wave and said means for producing standard samples each includes means for digitizing each sample and said means for storing samples of the detected shock wave and standard samples comprises first and second digital memory means respectively.

3. The apparatus of claim 2 further including:

first gate means, responsive to the output from said digitizing means, and having an output connected to the input of said first memory means for applying digitized samples of the press produced shock wave to said first memory means when enabled, second gate means, responsive to the output from said digitizing means, and having an output connected to second memory means for applying said digitized standard samples to said second memory means when enabled, and switch means for selectively enabling either said first gate means or said second gate means, whereby digitized samples of the press produced shock wave may be stored in said second memory means when the press is operating normally to thereby develop the standard samples against which other shock wave representative samples may be compared.

4. The apparatus of claim 2 wherein said means for storing said standard difference signals and said means for comparing each difference signal with its corresponding standard difference signal comprises respectively:

a plurality of storage means each storing a standard difference signal, and a plurality of comparator means, each associated with a different storage means, for comparing a standard difference signal with a selected one of said difference signals from said first arithmetic means to produce a warning indicator signal when said difference signal is greater than the standard difference with which it is compared, and a plurality of AND circuit means selectively enabled to apply each of said difference signals to a different one of said comparator means.

5. The apparatus of claim 4 wherein said AND circuit means includes delay means, responsive to a clock signal for successively applying said clock signal to different ones of said AND circuit means whereby only certain of said AND circuit means is enabled in coincidence with the generation of each of said difference signals.

6. The apparatus of claim 5 further including a plurality of indicator means each associated with a different one of said comparator means for providing human sense recognizable signals when its corresponding comparator means produces a warning indicator signal.

7. The apparatus of claim 2 wherein said means for comparing said difference signals with predetermined difference standard signals comprises:

a plurality of storage means each storing a difference standard signal, a second arithmetic means responsive to said difference signals from said first arithmetic means and said difference standard signals for producing a warning indicator signal when the received difference signal is greater than the received difference standard signal, and means for applying a predetermined one of said difference standard signals to said second arithmetic means in coincidence with each of said difference signals.

8. The apparatus of claim 7 wherein said means for applying predetermined difference standard signals to said second arithmetic means comprises, delay means responsive to a clock signal, for successively reading out predetermined difference standard signals from said storage means in time coincidence with the entry of said difference signals into said second arithmetic means.

9. The apparatus of claim 8 further including a plurality of indicator means for producing a human sense recognizable signal in response to warning indicator signals, a plurality of AND circuits each associated with a different one of said indicator means, and means coupling each of said AND circuits to said delay means to enable a different one of said AND circuits in response to the reading out of each of said difference standard signals.

10. A method of analyzing the shock waves produced by an impact press to develop warning indicator signals of press and/or its tooling malfunctions, comprising the steps of:

a. detecting each shock wave produced and converting said each shock wave into an electric analog signal, b. sampling said electric analog signal to produce a time phased series of amplitude samples, c. producing a standard electric analog signal which corresponds to the press produced shock wave when operating normally, d. sampling said standard signal to produce a time based series of amplitude samples of said standard signal, e. comparing each amplitude sample of said detected analog signal with its time corresponding standard sample to produce a series of difference signals, f. determining, experimentally, a plurality of difference standard signals each corresponding to the maximum allowable value of a different one of said plurality of difference signals, g. comparing said difference standard signals with their corresponding difference signals, and h. generating a warning indicator signal each time a difference signal is greater than its corresponding difference standard signal.

11. The method of claim 10 further including the steps of:

providing a plurality of indicator devices capable of producing human sense recognizable signals, each of said indicator devices being responsive to a different one of said warning indicator signals.

*12. Apparatus for monitoring the operation of a press having relatively moveable members, said members operating to close upon each other to thereby form a workpiece comprising:*

*a. transducer means for generating an electrical signal in response to a mechanical shock wave developed as the relatively moveable members close upon each other*

*b. filter means, responsive to said transducer generated electrical signal for eliminating selected frequencies from said electrical signal*

*c. means for producing a monitored shock wave function derived from said filtered transducer generated electrical signal*

*d. means for producing a standard function representative of said monitored shock wave function as it would appear when the press is operating normally*

*e. means for comparing said monitored shock wave function and said standard function, and*

*f. means for producing a warning indicator signal in response to predetermined differences between said monitored shock wave function and said standard function.*

*13. Apparatus as claimed in claim 12 wherein said filter means comprises a low pass filter.*

*14. Apparatus as claimed in claim 12 wherein said filter means includes a band limiting filter.*

*15. Apparatus for monitoring the operation of a press having relatively moveable members, said members operating to close upon each other to thereby form a workpiece comprising:*

*a. transducer means for generating an electrical signal in response to a mechanical shock wave developed as the relatively moveable members close upon each other*

*b. filter means responsive to said transducer generated electrical signal for eliminating selected frequencies from said electrical signal*

*c. means for producing a monitored shock wave function derived from said filtered transducer generated electrical signal, said monitored shock wave function being a function of the amplitude of said transducer generated electrical signal and the time during which the said transducer generated electrical signal persists*

*d. means for producing a standard function representative of said monitored shock wave function as it would appear when the press is operating normally*

*e. means for comparing said monitored shock wave function and said standard function, and*

*f. means for producing a warning indicator signal in response to predetermined differences between said monitored shock wave function and said standard function.*

*16. Apparatus as claimed in claim 15 wherein said filter means comprises a low pass filter.*

*17. Apparatus as claimed in claim 15 wherein said filter means includes a band limiting filter.*

* * * * *